United States Patent [19]

Oliveira, II

[11]  4,065,755
[45]  Dec. 27, 1977

[54] TOUCH-TONE ENCODER UNIT FOR MOBILE RADIO TRANSMITTER

[76] Inventor: Joseph P. Oliveira, II, 8060 Willoughby Ave., Hollywood, Calif. 90046

[21] Appl. No.: 751,033

[22] Filed: Dec. 16, 1976

[51] Int. Cl.$^2$ .............................................. H04M 11/00
[52] U.S. Cl. ........................... 340/171 PF; 340/171 R
[58] Field of Search ........ 340/171 PF, 171 R, 171 A, 340/384 R; 325/55, 64; 179/2 R

[56] References Cited

U.S. PATENT DOCUMENTS

| | | | |
|---|---|---|---|
| 3,594,503 | 7/1971 | Wolf | 340/171 PF |
| 3,863,222 | 1/1975 | Horowitz | 340/171 PF |

*Primary Examiner*—Harold I. Pitts
*Attorney, Agent, or Firm*—Keith D. Beecher

[57] ABSTRACT

A Touch-Tone encoder unit for a mobile radio transmitter, or the like, is provided, which includes a keyboard and an encoder generator connected thereto which generates two distinct tones whenever a particular button on the keyboard is depressed and which identify the particular button. The dual tones are transmitted to appropriate receiving equipment where they are decoded, so that by depressing a number of pushbuttons on the keyboard in a particular sequence, a call may be placed. The unit of the invention may include a timing circuit which limits the length of each dual tone generated by the encoder generator to make the duration of each dual tone independent of the length of time the individual pushbuttons are depressed, the actual duration of the individual dual tones being sufficiently short so as to reduce the error rate substantially, especially where the radio transmission path is poor. In addition, the encoder unit of the invention may include an amplifier for raising the level of the dual tones generated by the encoder generator sufficiently to permit the tones to be reproduced by a speaker for monitoring purposes, so that the user can determine whether or not the tones are being correctly generated as the pushbuttons of the keyboard are operated. Easily adjustable level controls are also provided in the unit to permit the level of the dual tones introduced to the monitor speaker and to the transmitter to be individually and easily adjusted without any necessity for the encoder itself to be disassembled.

8 Claims, 4 Drawing Figures

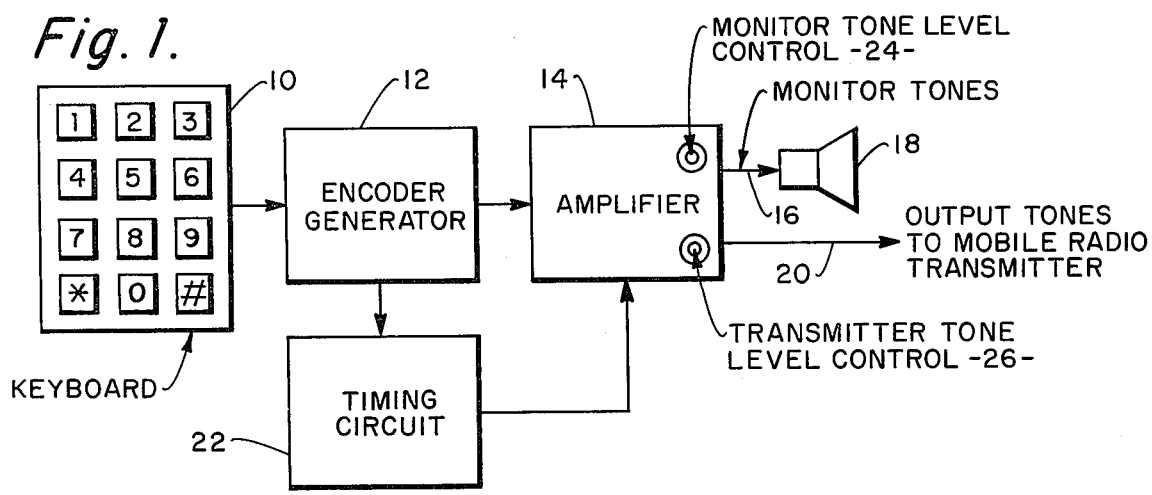
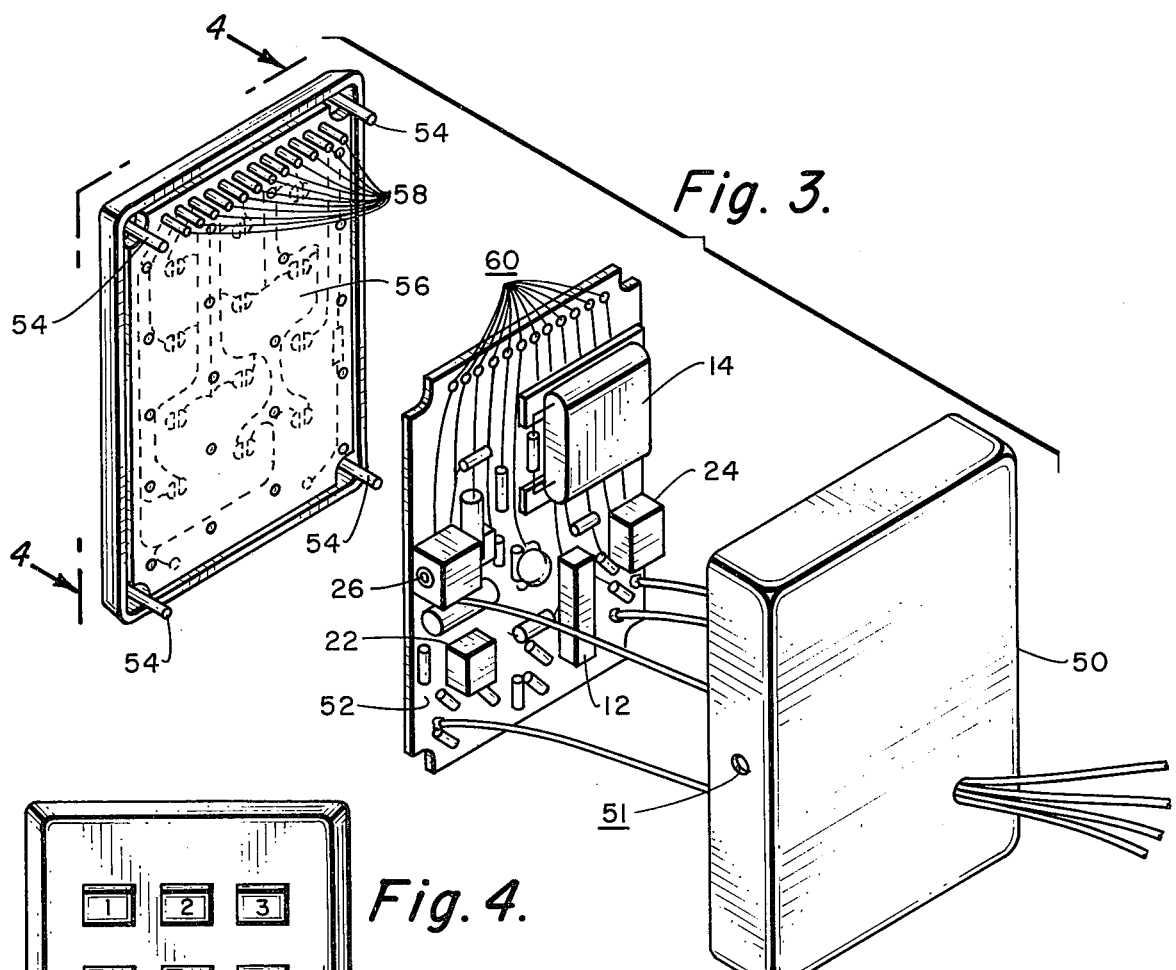
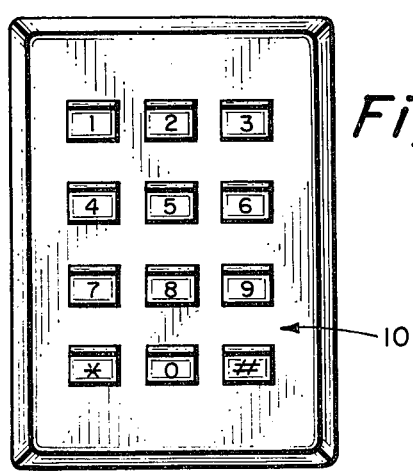

… … …

TOUCH-TONE ENCODER UNIT FOR MOBILE RADIO TRANSMITTER

RELATED PATENT APPLICATIONS

Application Ser. No. 750,440 filed Dec. 14, 1976.

BACKGROUND OF THE INVENTION

Two-way radio systems have become extremely popular in recent years, and so much so that usual prior art forms of voice signalling are no longer adequate. Digital and tone signalling equipment are presently in widespread use to provide selective calling, especially when the radio system is to be interconnected to a telephone exchange. The "Touch-Tone" system developed by American Telephone and Telegraph Company for its telephone switching networks has proven to be ideally adaptable to radio communication.

The usual telephone Touch-Tone encoder is designed so that when a particular pushbutton on the keyboard is depressed, a pair of signalling tones is produced, with each tone being carefully selected to avoid the principal harmonics normally created in speech and music. Touch-Tone signalling has been adapted to radio communication, as stated above, and has been used satisfactorily in the prior art in two-way radio systems.

However, a problem inherent in the prior art Touch-Tone encoders used in conjunction with radio transmitters is that as long as a particular pushbutton is depressed a continuous dual tone is produced. When such a dual tone is transmitted to the receiving equipment over a poor radio transmission path, it can exhibit intermittent characteristics. This creates a false selection effect, since it simulates the condition in which a particular pushbutton has been depressed several times. This problem is overcome in the system described in the above-mentioned copending application, which includes a timing circuit connected to the encoder which serves to cut off each dual tone a short time after it has been produced, so as to make the duration of each dual tone generated by the encoder relatively short and independent of the length of time during which the button on the keyboard which caused the encoder generator to produce the tone was depressed.

Another problem in the prior art Touch-Tone encoders as applied to radio communication is that, unlike usual telephone equipment, no provision is made in the prior art to enable the user to hear the tones being generated. Therefore, the user of the prior art equipment has no way of knowing whether the dual tones have been generated. This latter problem is also solved in the system of the copending application by providing an amplifier which is connected to the encoder generator, and which raises the level of the dual tones generated by the encoder generator to a level at which they may be reproduced by a speaker for monitoring purposes.

A further feature of the encoder of the copending application is the provision of readily accessible controls for setting the monitoring level and the transmission level of the dual tones generated by the encoder, these controls being accessible through respective holes in the encoder housing, so that the settings may be achieved without the necessity for dismantling the unit.

The present invention provides an improved unit which includes a keyboard and associated printed circuit board, and a housing therefor, and which is adapted to incorporate a further printed circuit board containing the encoder circuitry and further circuitry embodying one or more of the features of the system described in the copending application.

The unit of the invention facilitates the manufacturing process, because different printed circuit boards may be selectively incorporated into the unit depending upon which, if any, of the features of the system of the copending application are desired in any particular unit.

BRIEF DESCRIPTION OF THE DRAWINGS

FIG. 1 is a block diagram of an encoder system embodying the concepts of the copending application;

FIG. 3 is an exploded perspective view of an encoder unit constructed in accordance with one embodiment of the invention; and FIG. 4 is a view of the keyboard of the encoder of FIG. 3, taken along the line 4—4 of FIG. 3.

DETAILED DESCRIPTION OF THE ILLUSTRATED EMBODIMENT

Figure 2:
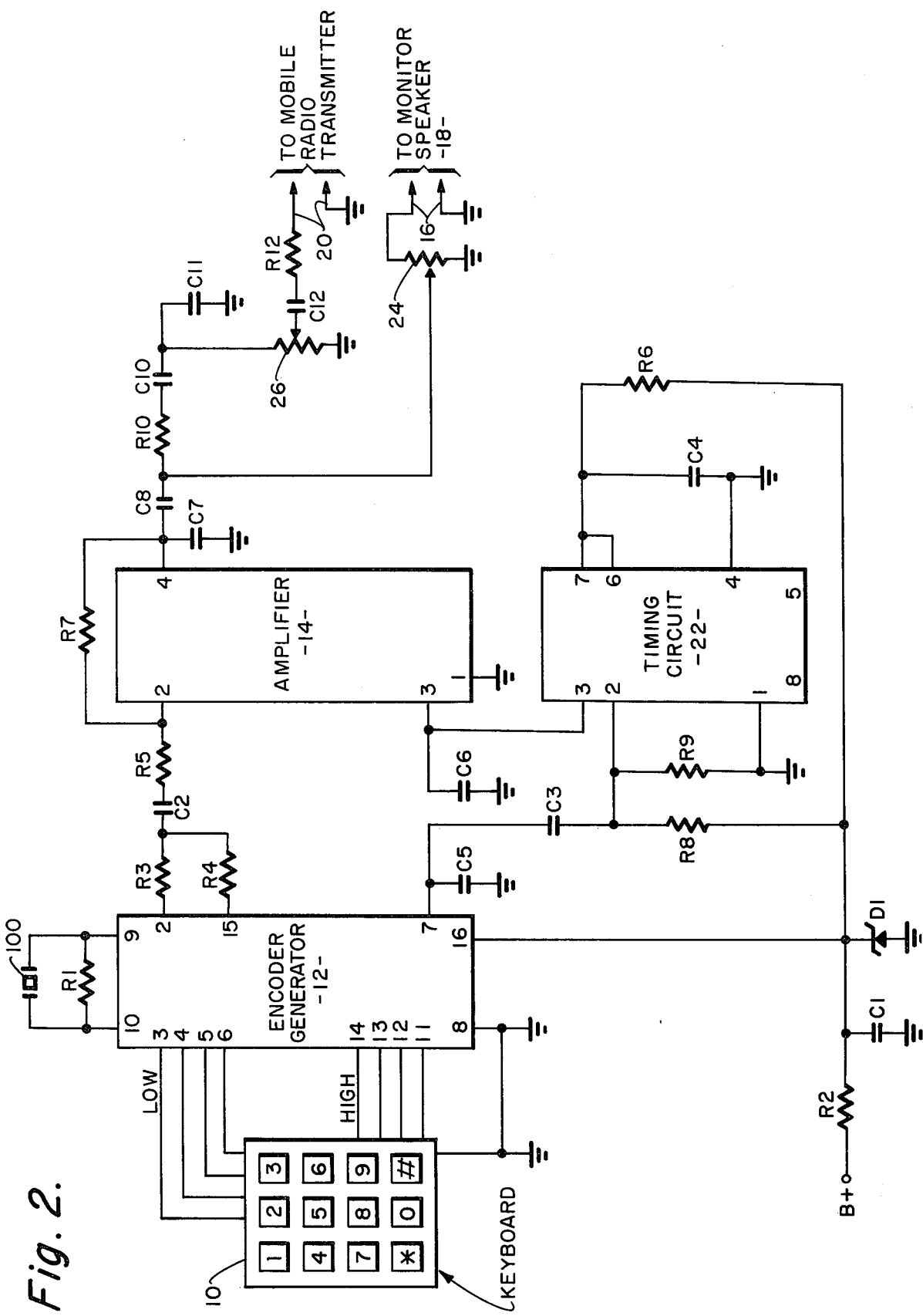
FIG. 2 is a more detailed schematic representation of the block diagram of FIG. 1.

The encoder system shown in FIG. 1, includes a keyboard 10. Keyboard 10 may be a typical Touch-Tone keyboard which includes a multiplicity of appropriately identified pushbutton switches which, when actuated, perform a switching function for an encoder generator designated by the block 12. Keyboard 10 may be of the type described in U.S. Pat. No. 3,800,104.

Whenever a particular pushbutton of keyboard 10 is operated, the encoder 12 is caused to generate a pair of tone signals which serve to identify the particular pushbutton.

Encoder generator 12 is connected to an amplifier 14. Amplifier 14 has a first output circuit connected by way of an output terminal 16 to a monitoring speaker 18; and a second output circuit connected to an output terminal 20. The output terminal 20 is connected, for example, to a mobile transmitter, so that the dual tones generated by the encoder generator 12, and amplified by amplifier 14 may be transmitted to appropriate receiving equipment.

Encoder generator 12 is also connected to a timing circuit 22 which, in turn, is connected to amplifier 14. Timing circuit 22 serves to block the amplifier 14 a predetermined time after the initiation of each dual tone by the encoder generator 12. This time may be set, for example, to be substantially 200 milliseconds.

Whenever a particular pushbutton of keyboard 10 is depressed, causing the encoder generator 12 to generate a dual tone corresponding to that pushbotton, the duration of the tone, as transmitted to the mobile transmitter by way of output terminal 20, and as introduced to monitoring speaker 18 by way of output terminal 16, is limited to a brief interval by the timing circuit 22. This control, as explained above, reduces the error rate considerably, especially when the radio transmission path is of poor quality.

The speaker 18 reproduces each dual tone generated by encoder generator 12, so that the user can hear the dual tones as they are generated for monitoring purposes. The level of the tones reproduced by the speaker 18 can be controlled by a tone level control 24. The tone level control 24 is accessible through a hole 51 in the housing 50 (FIG. 3) of the encoder, and takes the form of a potentiometer. Likewise, the dual tones introduced to the transmitter by way of output terminal 20 may be controlled by a tone level control 26. The latter control, likewise, may take the form of a potentiometer, and it also is accessible through a hole on the opposite side of the housing from hole 51.

As shown by the schematic diagram of FIG. 2, encoder generator 12 may be an integrated circuit which is commercially available by the Motorola Company and designated by them as 14410. The encoder generator is stabilized by a crystal 100 which is shunted by a 15 megohm resistor R1. The crystal and resistor R1 are connected across pins 9 and 10 of the integrated circuit. Keyboard 10 is connected to pins 3, 4, 5, 6 and 11, 12, 13 and 14 of encoder generator 12. Whenever a pushbutton on the keyboard is depressed, a dual switching effect is created, so that the encoder generator generates a pair of tones identifying each particular switch.

Pin 3 of the encoder generator 12 is grounded, and pin 16 is connected through a 200 ohm resistor R2 to the positive terminal B+ of an appropriate energizing potential source. Pin 16 is also connected to a grounded 0.1 microfarad capacitor C1 which is shunted by a Zener diode D1. The positive potential source B+ may have a value of 5.2 volts, and its negative terminal is grounded.

Pins 2 and 15 of encoder generator 12 are connected to respective 5 kilo-ohm resistor R3 and R4, the resistors both being coupled through a 3.3 microfarad capacitor C2 and through a 310 ohm resistor R5 to pin 2 of an integrated circuit of the type designated MFC-4000B, which constitutes the amplifier 14.

Pin 7 of the encoder generator is coupled through a 0.68 microfarad capacitor C3 to pin 2 of an integrated circuit of the tpe designated NE555, which constitutes the timing circuit 22. Pin 8 of the integrated circuit is connected to the positive terminal B+ through resistor R2, and is also connected to pins 6 and 7 through a 500 kilo-ohm resistor R6. Pin 4 is grounded, and pin 7 is connected to a grounded 0.15 microfarad capacitor C4. Pin 7 of encoder 12 is also connected to a 1.5 microfarad capacitor C5.

Pin 3 of timing circuit 22 is connected to pin 3 of amplifier 14, and also to a grounded 56 microfard capacitor C6. Pin 1 of amplifier 14 is grounded, and pin 4 is connected back to pin 2 through a 10 kilo-ohm feedback resistor R7. Pin 2 of timing circuit 22 is connected to pin 8 through a 100 kilo-ohm resistor R8, and pin 2 is connected to a grounded 100 kilo-ohm resistor R9, pin 1 being directly connected to ground, as is pin 1 of amplifier 14. Pin 4 of amplifier 14 is connected to a grounded 0.005 microfarad capacitor C7, and to a 0.56 microfarad capacitor C8. The latter capacitor is connected to the potentiometer 24, which may have a resistance, for example, of 500 ohms. Potentiometer 24, as mentioned above, provides a level control for the dual tones introduced to the monitor speaker 18.

Capacitor C8 is also connected through a 1 kilo-ohm resistor R10 to a further capacitor C10, the latter capacitor having a capacity of 0.33 microfarads. Capacitor C10 is connected to a 0.15 microfarad grounded capacitor C11 and to potentiometer 26. Potentiometer 26 may have a resistance of 20 kilo-ohms. The control arm of potentiometer 26 is coupled through a 0.1 microfarad capacitor C12 and through a 1 kilo-ohm resistor R12 to output terminals 20 which, as stated above, are connected to the mobile radio transmitter.

As explained above, whenever a pushbutton on keyboard 10 is depressed, a dual switching action occurs, so that encoder 12 produces a pair of tone signals at its output pins 2 and 15, both of which are introduced to the input pin 2 of amplifier 14 to be amplified to as desired level. At the initiation of the generation of the dual tones, encoder generator 12 transmits a control signal by way of its output pin 7 to pin 2 of the timing circuit to activate the timing circuit. A predetermined time interval after its activation, for example 200 milliseconds, timing circuit 22 passes a control from its pin 3 to pin 3 of amplifier 14 to block the amplifier. Therefore, as each pushbutton on keyboard 10 is depressed, amplifier 14 produces an amplified dual tone of a brief time duration, which is independent of the time during which the particular pushbutton is actuated.

Amplifier 14 produces the output dual tones at pin 4, and these tones are introduced to a first output circuit which includes potentiometer 24, so that the tone levels applied to the monitor speaker 18 may be set. The amplifier also includes a second output circuit which includes potentiometer 26, so that the levels of the dual tones applied to the mobile radio transmitter may also be set.

The system of FIGS. 1 and 2, therefore, comprise a Touch-Tone encoder with a timing circuit 22 that serves to cut out each dual tone generated by the encoder generator 12 after a time interval, for example, of 200 milliseconds. The system also includes a monitor which permits the operator to hear each dual tone as it is generated, and it also includes tone level adjustments which, as will be described, are easily accessible, and which permits the levels of the monitored and transmitted dual tones to be adjusted.

As described, whenever encoder generator 12 initiates a dual tone output, timing circuit 22 is initiated, and it serves to cut out amplifier 14 after a brief time interval. The system is such that the function may be repeated immediately by depressing the same or a second pushbutton on keyboard 10 without any repeat delay. The mobile radio transmitter, therefore, at all times transmits brief dual tones to the receiving equipment, so as to reduce error rate, especially for a poor radio transmission path.

One embodiment of the encoder unit of the invention which may serve to implement the system is shown in FIGS. 3 and 4. As shown in FIG. 3, the various electronic components of the encoder are mounted on a printed circuit board 52 which, in turn, is supported within housing 50. As shown in FIG. 4, the keyboard 10 forms the front face of the housing. Four legs 54 extend rearwardly from the four corners of the keyboard. These legs are received in bushings in the housing 50 and are glued in place to hold the unit in an assembled condition.

A switching circuit board 56 is mounted on the rear side of the keyboard. A plurality of connector pins 58 extend rearwardly from the circuit board. Different pairs of the pins are connected together when different pushbuttons on keyboard 10 are depressed.

The pins 58 are received in mating sockets 60 on printed circuit board 52 so that the appropriate connections may be made from the keyboard to the components on the printed circuit board 52. In this way, an encoder unit may be provided incorporating one or more of the features of the system of FIGS. 1 and 2, merely by inserting the corresponding circuit board 52 into the unit.

It will be appreciated that although a particular embodiment of the invention has been shown and described, modifications may be made. It is intended in the claims to cover all modifications which come within the true spirit and scope of the invention.

What is claimed is:

1. A Touch-Tone encoder unit comprising: a housing having an open front; a keyboard having a plurality of pushbutton switches thereon mounted in said housing and providing a closure for the open front thereof; a switching circuit board electrically connected to the pushbutton switches on the keyboard mounted on the rear face of said keyboard and contained within said housing; a further circuit board mounted in said housing adjacent to said switching circuit board and electrically connected thereto; a first circuit means including electric components and circuitry constituting an encoder generator circuit mounted on said further circuit board for producing dual tones as the pushbutton switches on the keyboard are individually depressed; second circuit means mounted on said further circuit board including electric components and circuitry connected to said first circuit means for limiting the duration of each dual tone generated thereby to a predetermined time interval independent of the time during which the corresponding pushbutton switch is depressed; and fastening means for securing said housing to said keyboard to hold the unit in an assembled condition.

2. The Touch-Tone encoder unit defined in claim 1, in which one of said circuit boards has a plurality of connecting pins protruding outwardly therefrom, and in which the other of said circuit boards has a plurality of connecting holes receiving respective ones of said pins to establish electrical connection between the switching circuit board and the circuits on said further circuit board.

3. The Touch-Tone encoder unit defined in claim 1, in which said fastening means includes a plurality of mounting posts extending between said keyboard and said housing.

4. The Touch-Tone encoder unit defined in claim 1, in which the electric components mounted on said further circuit board includes at least one manually adjustable signal level control element, and in which said housing has a hole therein to permit adjustment of said control element.

5. The Touch-Tone encoder unit defined in claim 1, in which said second circuit means includes an amplifier circuit connected to the encoder generator circuit for amplifying the dual tones produced thereby, and a timing circuit connected to the amplifier circuit for blocking the amplifier circuit a predetermined time interval after the initiation of each dual tone.

6. The Touch-Tone encoder unit defined in claim 5, in which said second circuit means includes a first output circuit connected to the amplifier circuit for deriving the amplified dual tones therefrom, and for introducing the tones to a monitoring speaker.

7. The Touch-Tone encoder unit defined in claim 6, in which said second circuit means includes a first potentiometer in said first output circuit for controlling the level of tones reproduced by said speaker, said first potentiometer being accessible through a hole in said housing.

8. The Touch-Tone encoder unit defined in claim 5, in which said second circuit means includes a second output circuit connected to the amplifier for deriving the amplified dual tones therefrom for transmission to remote receiving equipment, and which includes a second potentiometer in said second output circuit for controlling the level of the amplified tones, said second potentiometer being accessible for manual adjustment through a hole in said housing.

* * * * *